(12) United States Patent
Schoolcraft

(10) Patent No.: US 9,228,650 B2
(45) Date of Patent: Jan. 5, 2016

(54) GEAR SCHEME FOR INFINITELY VARIABLE TRANSMISSION

(75) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 575 days.

(21) Appl. No.: 13/209,902

(22) Filed: Aug. 15, 2011

(65) Prior Publication Data

US 2012/0040794 A1 Feb. 16, 2012

Related U.S. Application Data

(60) Provisional application No. 61/374,048, filed on Aug. 16, 2010.

(51) Int. Cl.
*F16H 59/08* (2006.01)
*F16H 37/08* (2006.01)
*F16H 37/10* (2006.01)

(52) U.S. Cl.
CPC ........ *F16H 37/086* (2013.01); *F16H 2037/101* (2013.01); *F16H 2037/107* (2013.01)

(58) Field of Classification Search
CPC ............ F16H 37/086; F16H 2037/101; F16H 2037/107; F16H 2037/108
USPC .......................................... 475/216, 219, 207
See application file for complete search history.

(56) References Cited

U.S. PATENT DOCUMENTS

| | | | |
|---|---|---|---|
| 4,922,788 A | 5/1990 | Greenwood | |
| 5,090,951 A | 2/1992 | Greenwood | |
| 5,217,418 A | 6/1993 | Fellows et al. | |
| 5,232,414 A | 8/1993 | Fellows et al. | |
| 5,242,337 A | 9/1993 | Greenwood | |
| 5,263,907 A | 11/1993 | Fellows | |
| 5,308,297 A | 5/1994 | Greenwood | |
| 5,308,298 A | 5/1994 | Lambert | |
| 5,316,526 A | 5/1994 | Fellows | |
| 5,338,268 A | 8/1994 | Greenwood | |
| 5,395,292 A | 3/1995 | Fellows et al. | |
| 5,401,221 A * | 3/1995 | Fellows et al. ................ | 475/214 |
| 5,423,727 A | 6/1995 | Fellows | |
| 5,453,061 A | 9/1995 | Fellows | |
| 5,521,819 A | 5/1996 | Greenwood | |
| 5,564,993 A | 10/1996 | Robinson | |

(Continued)

FOREIGN PATENT DOCUMENTS

| | | |
|---|---|---|
| CN | 1226954 | 8/1999 |
| CN | 101918737 | 12/2010 |

(Continued)

OTHER PUBLICATIONS www.toolingu.com screenshot of definition of "idler gear", Dec. 8, 2009.*

(Continued)

*Primary Examiner* — Justin Holmes
*Assistant Examiner* — Stacey Fluhart
(74) *Attorney, Agent, or Firm* — Barnes & Thornburg LLP

(57) ABSTRACT

A gear scheme for an infinitely variable transmission includes an input shaft, an output shaft, a variator, and a pair of planetary gearsets located beside the variator rather than in front of or behind the variator. The variator and the planetary gearsets are coupled between the input and output shafts.

19 Claims, 6 Drawing Sheets

(56) References Cited

U.S. PATENT DOCUMENTS

| | | | |
|---|---|---|---|
| 5,564,998 | A | 10/1996 | Fellows |
| 5,643,121 | A | 7/1997 | Greenwood et al. |
| 5,667,456 | A | 9/1997 | Fellows |
| 5,720,687 | A * | 2/1998 | Bennett ................. 475/214 |
| 5,766,105 | A | 6/1998 | Fellows et al. |
| 5,803,857 | A * | 9/1998 | Yamamoto ............... 475/192 |
| 5,820,508 | A | 10/1998 | Konig et al. |
| 5,820,513 | A | 10/1998 | Greenwood |
| 5,895,337 | A | 4/1999 | Fellows et al. |
| 5,938,557 | A | 8/1999 | Greenwood |
| 5,971,885 | A | 10/1999 | Greenwood et al. |
| 6,030,310 | A | 2/2000 | Greenwood et al. |
| 6,066,067 | A | 5/2000 | Greenwood |
| 6,071,209 | A | 6/2000 | Greenwood |
| 6,273,839 | B1 | 8/2001 | Dutson |
| 6,306,060 | B1 | 10/2001 | Dutson et al. |
| 6,312,356 | B1 | 11/2001 | Greenwood |
| 6,464,614 | B2 | 10/2002 | Dutson |
| 6,626,793 | B1 | 9/2003 | Greenwood |
| 6,666,791 | B1 | 12/2003 | Greenwood |
| 6,979,276 | B2 | 12/2005 | Murray |
| 7,018,320 | B2 | 3/2006 | Robinson et al. |
| 7,056,261 | B2 | 6/2006 | Fuller |
| 7,160,226 | B2 | 1/2007 | Fuller |
| 7,278,951 | B2 | 10/2007 | Fuller |
| 7,318,786 | B2 | 1/2008 | Greenwood et al. |
| 7,407,459 | B2 | 8/2008 | Greenwood et al. |
| 7,491,149 | B2 | 2/2009 | Greenwood et al. |
| 7,530,916 | B2 | 5/2009 | Greenwood |
| 7,563,194 | B2 | 7/2009 | Murray |
| 7,614,973 | B2 | 11/2009 | Parthuisot |
| 7,625,309 | B2 | 12/2009 | Fuller |
| 7,632,208 | B2 | 12/2009 | Greenwood et al. |
| 7,637,841 | B2 | 12/2009 | Dutson |
| 7,951,041 | B2 | 5/2011 | Dutson |
| 7,955,210 | B2 | 6/2011 | Greenwood et al. |
| 2004/0038773 | A1 | 2/2004 | Robinson et al. |
| 2005/0143216 | A1 | 6/2005 | Greenwood et al. |
| 2005/0176547 | A1 | 8/2005 | DeFreitas |
| 2006/0142110 | A1 | 6/2006 | Greenwood et al. |
| 2006/0160656 | A1 | 7/2006 | Dutson |
| 2006/0234822 | A1 | 10/2006 | Morscheck et al. |
| 2007/0072736 | A1 | 3/2007 | Defreitas et al. |
| 2007/0112495 | A1 | 5/2007 | Murray |
| 2007/0142163 | A1 | 6/2007 | Murray |
| 2007/0275817 | A1 | 11/2007 | Newall |
| 2008/0146399 | A1 | 6/2008 | Oliver et al. |
| 2008/0153659 | A1 | 6/2008 | Greenwood |
| 2008/0269001 | A1 | 10/2008 | Greenwood et al. |
| 2009/0048054 | A1 | 2/2009 | Tsuchiya et al. |
| 2009/0062065 | A1 | 3/2009 | Field et al. |
| 2009/0105041 | A1 | 4/2009 | McKenzie et al. |
| 2009/0203486 | A1 | 8/2009 | Murray |
| 2009/0305840 | A1 | 12/2009 | Oliver |
| 2011/0021303 | A1 * | 1/2011 | Sich .............................. 475/210 |

FOREIGN PATENT DOCUMENTS

| | | | |
|---|---|---|---|
| DE | 102008001326 | * 10/2009 | .............. F16H 37/08 |
| GB | 2361510 | 10/2001 | |
| GB | 2368618 | 5/2002 | |
| GB | 2384531 | 7/2003 | |
| GB | 2397630 | 7/2004 | |
| GB | 2410302 | 7/2005 | |
| GB | 2418235 | 3/2006 | |
| GB | 2438412 | 11/2007 | |
| GB | 2440746 | 2/2008 | |
| GB | 2455030 | 6/2009 | |
| GB | 2459857 | 11/2009 | |
| GB | 2460237 | 11/2009 | |
| GB | 2470717 | 12/2010 | |
| GB | 2474870 | 5/2011 | |

OTHER PUBLICATIONS http://www.merriam-webster.com/dictionary/shunt screenshot of definition of "shunt", Apr. 22, 2009.*

Wikipedia NPL, snapshot of http://en.wikipedia.org/wiki/Gear_ratio, dated Dec. 12, 2008, portion relating to idler gears.*

International Search Report dated Jan. 13, 2012, for International Application No. PCT/US2011/047764.

Search Report and Written Opinion from the State Intellectual Property Office for the People's Republic of China for Application No. 201180043976.1, dated Apr. 1, 2015, 5 pages.

* cited by examiner

GEAR SCHEME FOR INFINITELY VARIABLE TRANSMISSION

This application claims the benefit of U.S. Provisional Patent Application Ser. No. 61/374,048, filed Aug. 16, 2010, which is incorporated herein by this reference in its entirety.

TECHNICAL FIELD

The present disclosure relates generally to transmissions for powered vehicles, and more particularly to gear schemes for transmissions that include a variator.

BACKGROUND

Transmissions for powered vehicles transfer torque output by the vehicle's drive unit to one or more loads. In some transmissions, a ratio varying unit ("variator") is used to provide a continuous variation of transmission ratio rather than a series of predetermined ratios. The variator is coupled between the transmission input and the transmission output via gearing and one or more clutches.

Continuously variable transmissions may have multiple operating modes, where each operating mode covers a portion of the overall ratio spread of the transmission. Each operating mode is selectable, e.g. by a clutch that is engaged by the application of hydraulic fluid pressure as commanded by the transmission's control unit.

Some continuously variable transmissions have a "geared neutral" mode, in which the continuous variation of ratio passes through the geared neutral mode in transitioning from a reverse ratio to a forward ratio. In the geared neutral position, the vehicle's speed is zero, independently of the rotational speed output by the vehicle's drive unit. Transmissions that have a geared neutral mode may be referred to as infinitely variable transmissions.

SUMMARY

According to one aspect of this disclosure an infinitely variable transmission having a geared neutral mode and at least three forward operating modes includes an input shaft, an output shaft spaced from the input shaft, and a variator having continuously variable torque output. The variator is coupled between the input shaft and the output shaft. The transmission also includes a pair of planetary gearsets coupled between the input and output shafts. The planetary gearsets are coupled to each other and coupled to the variator. The planetary gearsets are positioned beside the variator in the transmission.

The transmission may include less than three planetary gearsets. The output shaft may be coaxial with the input shaft. A portion of the planetary gearsets may be coplanar with the variator. The transmission may include less than four output gearsets coupled between the planetary gearsets and the output shaft. The transmission may include a third planetary gearset coupled between the variator and the output shaft and less than three output gearsets coupled between the planetary gearsets and the output shaft. The diameter of a circle encompassing the transmission is less than the diameter of a mounting flange of a drive unit to which the transmission is mountable.

According to another aspect of this disclosure, an infinitely variable transmission includes a variator, and a pair of planetary gearsets laterally spaced from the variator. Each of the planetary gearsets has at least one component coupled to the other and at least one component coupled to the variator. The transmission also includes a plurality of output gearsets coupled to the planetary gearsets and the variator, and first, second, third and fourth torque transmitting mechanisms. The first torque transmitting mechanism is engageable to place the transmission in a geared neutral mode, the second torque transmitting mechanism is engageable to place the transmission in a first forward operating mode, the third torque transmitting mechanism is engageable to place the transmission in a second forward operating mode, and the fourth torque transmitting mechanism is engageable to place the transmission in a third forward operating mode.

The transmission may have a double shunt architecture, such that the variator is isolated from transmission input and transmission output when the first torque transmitting mechanism is engaged, and the transmission is output coupled when any of the second, third, and fourth torque transmitting mechanisms is engaged and the remaining torque transmitting mechanisms are not engaged.

The first, second, third, and fourth torque transmitting mechanisms may be rotating clutches. The first, third and fourth torque transmitting mechanisms may be rotating clutches while the second torque transmitting mechanism is a stationary clutch.

According to a further aspect of this disclosure, an infinitely variable transmission includes a first centerline comprising a variator and between zero and two output gearsets and between zero and two selectively engageable torque transmitting mechanisms, a second centerline parallel to and spaced from the first centerline and comprising at least one of an input shaft and an output shaft, and a third centerline spaced from and parallel to both the first and the second centerlines and comprising a pair of planetary gearsets, each planetary gearset having at least one component connected to a component of the other planetary gearset, between zero and three output gearsets and between zero and four selectively engageable torque transmitting mechanisms.

The transmission may include a first gearset coupled to the input shaft and to a first component of the planetary gearsets, a second gearset coupled to a first side of the variator and to a second component of the planetary gearsets, and a third gearset coupled to a second side of the variator and to a third component of the planetary gearsets. The first gearset may include an idler. The fourth gearset may be coupled to the output shaft and selectively coupled to output of the third gearset.

The transmission may include a fifth gearset coupled to the output shaft and selectively coupled to the output of the third gearset. The first gearset may include a first idler and the fifth gearset may include a second idler.

The third centerline may include three concentric shafts. The transmission may include a first shaft located on the third centerline, where at least the first gearset and the planetary gearsets are connected to the first shaft. The transmission may include a second shaft concentric with the first shaft, wherein a first component of the planetary gearsets is coupled to the second shaft and at least the fourth gearset is selectively coupled to the second shaft. The transmission may include a third shaft concentric with the first and second shafts, wherein a second component of the planetary gearsets is coupled to the third shaft and at least the fourth gearset is selectively coupled to the third shaft.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

DETAILED DESCRIPTION

Figure 1A:
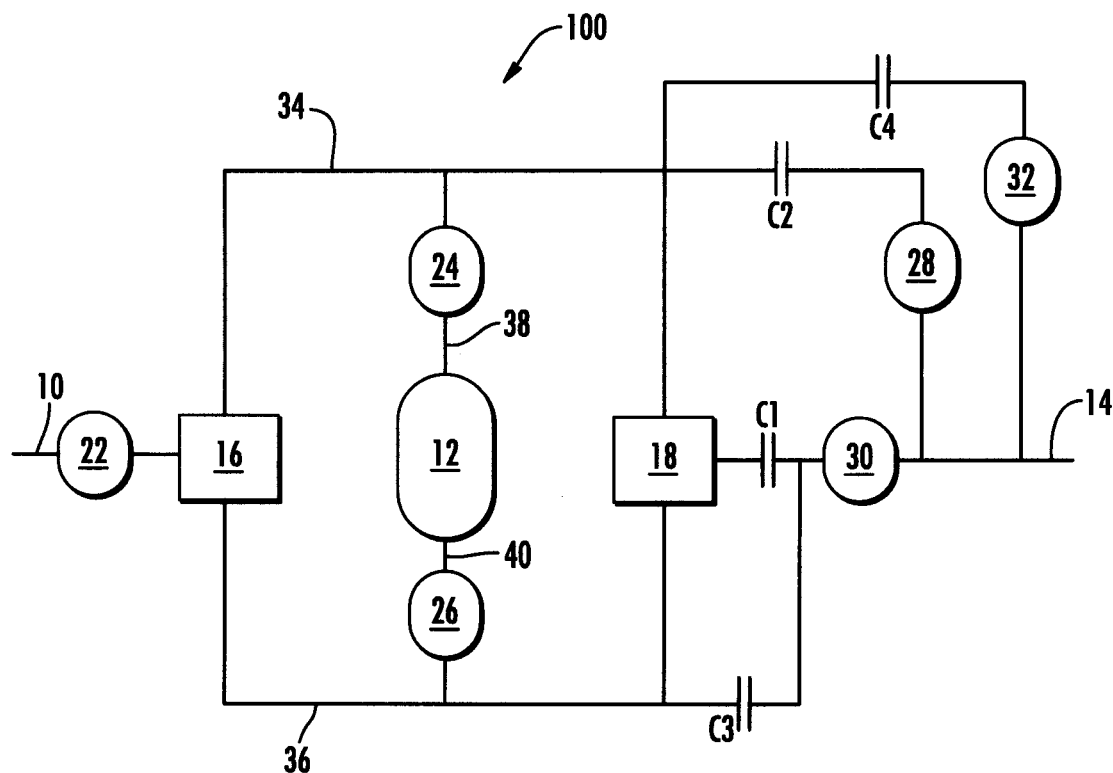
FIG. 1A is a diagrammatic representation of a gear scheme for an infinitely variable transmission.

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments. For example, while certain aspects of the disclosure are discussed herein in the context of an infinitely variable transmission, it will be understood by those skilled in the art that aspects of the present disclosure are applicable to other types and configurations of vehicle transmissions.

This disclosure describes a number of gear schemes that provide multiple operating modes for an infinitely variable transmission. This disclosure also illustrates and describes a number of gearset and clutch arrangements that may be used to implement the illustrated gear schemes. In each case, the transmission gearing is driven by a rotating input shaft 10, and the output of the transmission is transferred to the vehicle load by a rotating output shaft 14. In the drawings, the input and output shafts 10, 14 are shown as being coaxial, but this does not need to be the case.

A drive unit (not shown) drives the rotation of the input shaft 10. The drive unit may include an internal combustion engine, such as a spark-ignited or compression-ignition type (i.e. diesel) engine, an engine-electric motor combination, or other suitable source of rotational power. The vehicle load may be, for example, the vehicle's drive wheels, an auxiliary gearbox (e.g. a transfer case or drop box), or a power take-off device, such as a pump, mixer, lifter, shoveled, compressor, compactor, or blower, as may be provided with commercial vehicles such as trucks or busses.

Between the input shaft 10 and the output shaft 14 there are a number of input gearsets 22, 24, 26, a variator 12, a number of output gearsets 28, 30, 32, and a number of selectively engageable torque transmitting mechanisms, e.g. C1, C2, C3, and C4.

The illustrated variator 12 is a toroidal variator, such as a full toroidal traction drive type variator manufactured by Torotrak Development, Ltd. of Lancashire, United Kingdom. However, it will be understood by those skilled in the art that other types of variations may be used to provide a continuous variation of transmission ratio.

The variator 12 has input discs 11, 13, which are coupled to a variator input shaft 38. The variator 12 also has output discs 7, 9, which are coupled to a variator output shaft 40. The space between the inner surfaces of the input discs and the inner surfaces of the corresponding output discs (e.g. the inner surfaces of discs 11, 7 and discs 13, 9) form a hollow doughnut shape or 'toroid.' A number of rollers (not shown) are located inside the toroidal space defined by the inner surfaces of the discs 7, 11, 9, 13. The rollers transmit torque from the input discs 11, 13 to the output discs 7, 9 via a traction fluid (not shown).

The variator torque is controlled by a hydraulic circuit (not shown), which includes hydraulic actuators (e.g., pistons and lever assemblies) that apply an adjustable force to the rollers. The force applied by a hydraulic actuator to a roller is balanced by a reaction force resulting from the torques transmitted between the surfaces of the variator disks and the rollers. The end result is that in use, each roller continuously moves and processes to the locations and tilt angles required to transmit a torque determined by the force applied by the hydraulic actuators. A difference in the forces applied to the rollers changes the rollers' tilt angle and thus, the variator ratio. A change in the rollers' tilt angle may result not only in a net torque at the transmission output but could also result in a change in torque direction. The direction of the torque output determines whether the torque application is positive or negative.

Figure 5:
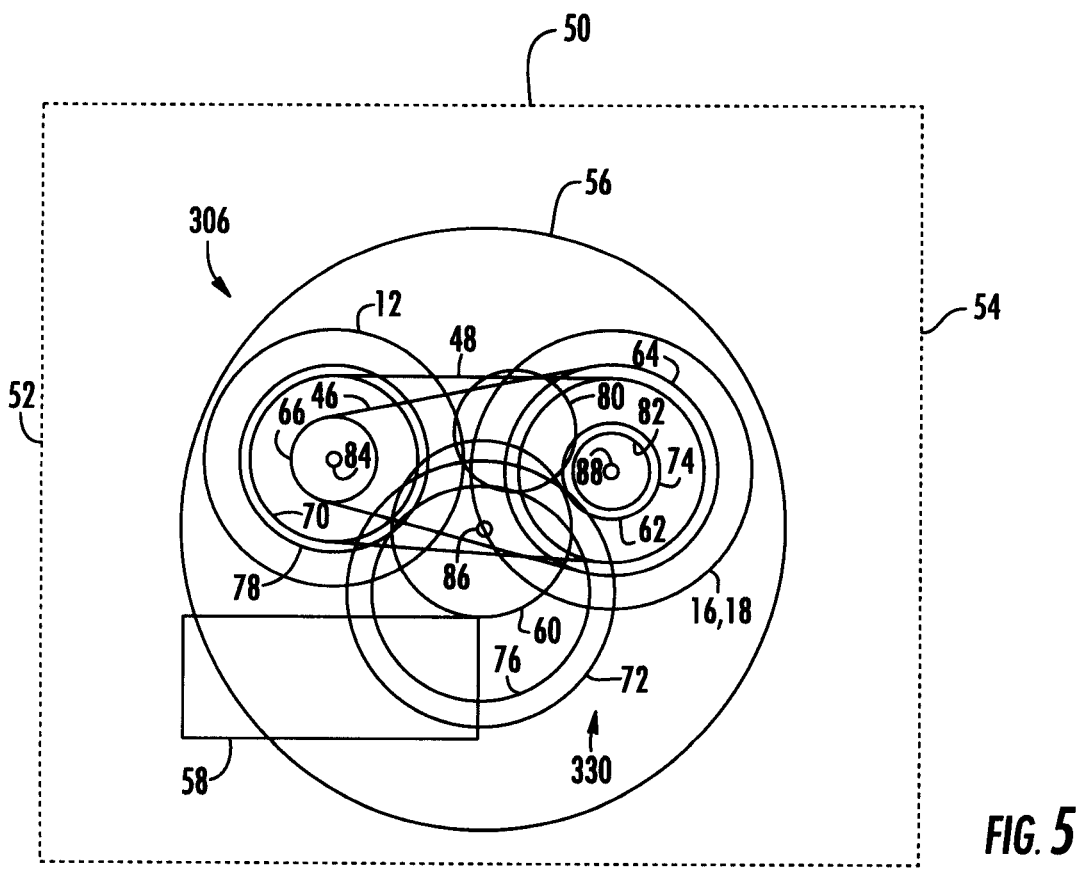
FIG. 5 is a diagrammatic end view of the gearing arrangement of FIG. 3D.

One feature of the disclosed transmission gear schemes is that one or more planetary gearsets 16, 18 are positioned beside, rather than in front of or behind, the variator 12; thereby shortening the overall length of the transmission. The disclosed gear schemes each have a number of spaced-apart (i.e. non-coaxial) centerlines (e.g., axes about which components of the transmission rotate) 84, 86, 88. The variator 12 is located on the centerline 84. The planetary gearsets 16, 18 are located on the centerline 88, which is parallel to and spaced from the centerline 84. The input and output shafts 10, 14 are located on the centerline 86, which is parallel to and spaced from the centerlines 84, 88. The centerlines 84, 86, 88 may or may not be coplanar with one another. FIG. 5 illustrates a configuration in which the centerlines 84 and 88 lie in the same horizontal plane while the centerline 86 lies in a different horizontal plane.

In general, the disclosed gear schemes have a number of operating modes, including a geared neutral mode and multiple forward ranges. In each of the operating modes, one of the torque transmitting mechanisms is engaged and the other torque transmitting mechanisms are not engaged. Switching from one operating mode to another involves releasing one of the torque transmitting mechanisms and engaging another of the torque transmitting mechanisms. A transition between two forward ranges involves a synchronous shift.

The torque transmitting mechanisms may be any suitable type of clutches, brakes, or similar devices, including, but not limited to wet clutches, dry clutches, and dog clutches. For example, some versions of the illustrated transmission use rotating clutches, while other versions use a combination of rotating and stationary clutches. In some cases, friction-based torque transmitting mechanisms are used, while in other cases, interference-based torque transmitting mechanisms may be used.

The application and release of the torque transmitting mechanisms to accomplish shifting from one operating mode to another operating mode may be accomplished manually by the vehicle operator, or may be fully or partially automated (e.g. by electronic, electro-hydraulic or electro-pneumatic control systems).

The illustrated gear schemes use four torque transmitting mechanisms, C1, C2, C3, C4, to provide one geared neutral mode and three forward ranges. In each of the operating modes, one of the torque transmitting mechanisms C1, C2, C3, C4 is engaged and the other torque transmitting mechanisms C1, C2, C3, C4 are not engaged. The illustrated examples use a naming convention in which the number of a torque transmitting mechanism corresponds to the number of the mode in which the torque transmitting mechanism is applied (i.e. C1 is applied in mode 1, C2 is applied in mode 2, and so on).

In other versions of the disclosed gear scheme, a larger or smaller number of operating modes may be provided, and a larger or smaller number of torque transmitting mechanisms may be used. For example, if more than four operating modes are desired, more than four torque transmitting mechanisms may be used, and if fewer than four operating modes are desired, less than four torque transmitting mechanisms may be used. Also, in the illustrated examples, the first operating mode (i.e. mode 1) is a geared neutral mode, and the remaining modes are forward ranges, but this arrangement is not necessarily required.

FIGS. 1A, 2A, 3A, and 4A illustrate gear schemes for the four-mode infinitely variable transmission described above. In each of these gear schemes, a double shunt architecture is used for the geared neutral mode (mode 1), while the forward modes (modes 2-4) are output coupled.

FIG. 1A illustrates one gear scheme 100 for an infinitely variable transmission. The gear scheme 100 has an input gearset 22 that is driven by the vehicle's drive unit via the transmission input shaft 10. The input gearset 22 is connected to a planetary gearset 16. The output of one of the components of the planetary gearset 16 is connected to one side of the variator 12 via a gearset 24 and a shaft 38. The output of another component of the planetary gearset 16 is connected to another side of the variator 12 via a gearset 26 and a shaft 40. As illustrated, the shaft 38 connects to an input side of the variator 12 and the shaft 40 connects to an output side of the variator 12, however, this particular arrangement is not required. In other versions of the gear scheme 100, the output side of the variator 12 may be connected to a component of the planetary gearset 16 via the gearset 24 and the input side of the variator 12 may be connected to a component of the planetary gearset 16 via the gearset 26. Generally, in each of the illustrated embodiments, the orientation of the variator 12 may be as shown or may be 'flipped' so that the locations of the input side and the output side are opposite to those shown in the drawings.

The planetary gearset 18 has a component connected to one side of the variator 12 via the gearing 24 and another component connected to the other side of the variator 12 via the gearing 26. At least one component of the planetary gearset 16 is connected to a component of the planetary gearset 18.

The gear scheme 100 includes three output gearsets 28, 30, and 32. The torque transmitting mechanisms C1, C2, C3, C4 are selectively engageable to determine the torque output by the output shaft 14. When either of torque transmitting mechanisms C1 or C3 are engaged, the output gearset 30 is employed. When the torque transmitting mechanism C2 is engaged, then the output gearset 28 is employed. When the torque transmitting mechanism C4 is engaged, the output gearset 32 is employed.

Figure 1B:
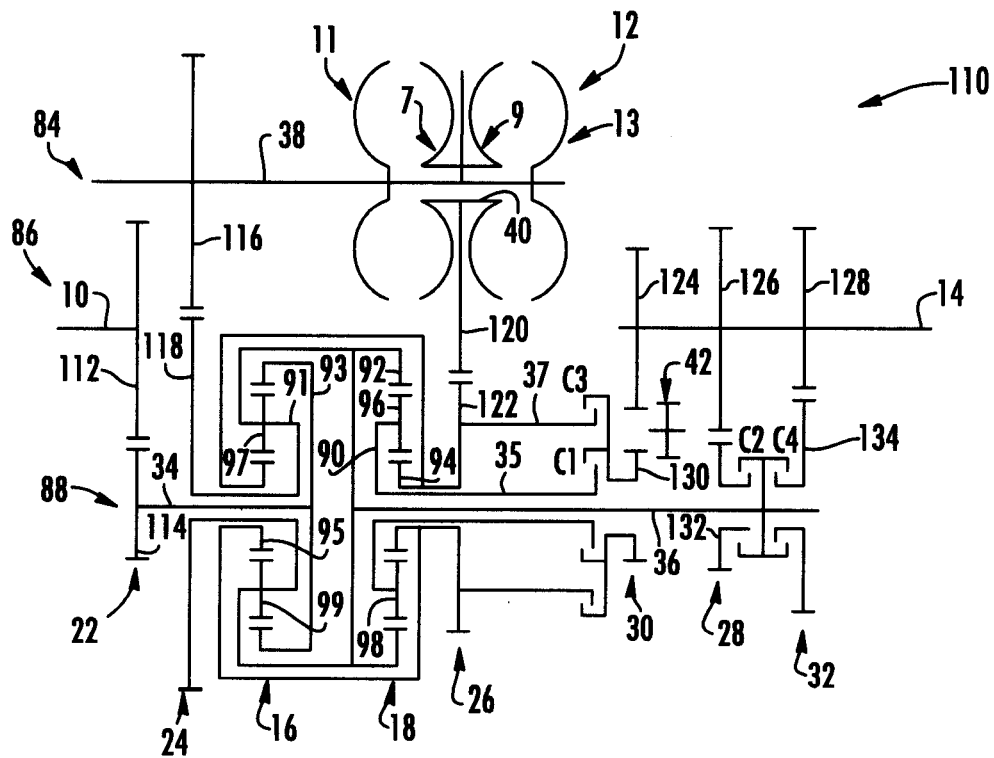
FIG. 1B is a schematic representation of a gearing arrangement for the gear scheme of FIG. 1A.

FIG. 1B illustrates one gearset and clutch arrangement for the gear scheme of FIG. 1A, in which the shaft 38 is positioned on the centerline 84, the input and output shafts 10, 14 are positioned on the centerline 86, and the centerline 88 has a number of coaxial shafts 34, 35, 36, 37. In the arrangement of FIG. 1B, each of the output gearsets 28, 30, 32 has a gear (124, 126, 128) that is concentric with and rotates with the output shaft 14.

The output gearset 32 includes intermeshing gears 128, 134. The gear 134 is concentric with the shafts 34, 35, 36, 37. The gear 134 rotates about the shaft 36 when the torque transmitting mechanism C4 is not applied. The gear 134 rotates with the shaft 36 when the torque transmitting mechanism C4 is applied.

The output gearset 28 includes intermeshing gears 126, 132. The gear 132 is concentric with the shafts 34, 35, 36, 37. The gear 132 rotates about the shaft 36 when the torque transmitting mechanism C2 is not applied. The gear 132 rotates with the shaft 36 when the torque transmitting mechanism C2 is applied.

The output gearset 30 includes gears 124, 130, and an idler 42 interposed therebetween. The gear 130 is concentric with the shafts 34, 35, 36, 37. The gear 130 rotates about the shaft 36. When the torque transmitting mechanism C1 is applied, the gear 130 rotates with the shaft 35. When the torque transmitting mechanism C3 is applied, the gear 130 rotates with the shaft 37.

The planetary gearsets 16, 18 are positioned on the centerline 88. The planetary gearset 18 has a carrier 90, which is driven by the output of planet gears 96, 98. The planetary gearset 18 also has a ring gear 92 and a sun gear 94. The shaft 36 is connected to and rotates with the ring gear 92. The shaft 35 is connected to the output of the carrier 90.

The gearset 26 includes intermeshing gears 120, 122. The shaft 37 is coupled to the output of the sun gear 94 via the gear 122. The gear 122 is concentric with and rotates about the shafts 35, 36. The gear 120 is connected to the output of the variator 12 and is concentric with the shafts 38, 40. When the output of the variator 12 is different than the input to the variator 12, the gear 120 rotates with the variator output shaft 40. When the output of the variator 12 is the same as the input to the variator 12, the gear 120 rotates with the input shaft 38.

The gearset 24 includes intermeshing gears 116, 118. The gear 116 is concentric with and rotates with the shaft 38. The gear 118 is concentric with and rotates about the shaft 34.

The planetary gearset 16 has a carrier 91, which is driven by planet gears 97, 99. The planet gears 97, 99 of the planetary gearset 16 are also connected to the ring gear 92 of the planetary gearset 18.

The planetary gearset 16 also has a ring gear 93 and a sun gear 95. The output of the gear 118 is connected to the carrier 91. The sun gear 95 is connected to the output of the sun gear 94 of the planetary gearset 18. The ring gear 93 is connected to and rotates with the shaft 34.

The input gearset 22 includes intermeshing gears 112, 114. The gear 114 is concentric with and rotates with the shaft 34. The gear 112 is concentric with and rotates with the input shaft 10, which is driven by a drive unit as discussed above.

Figure 1C:
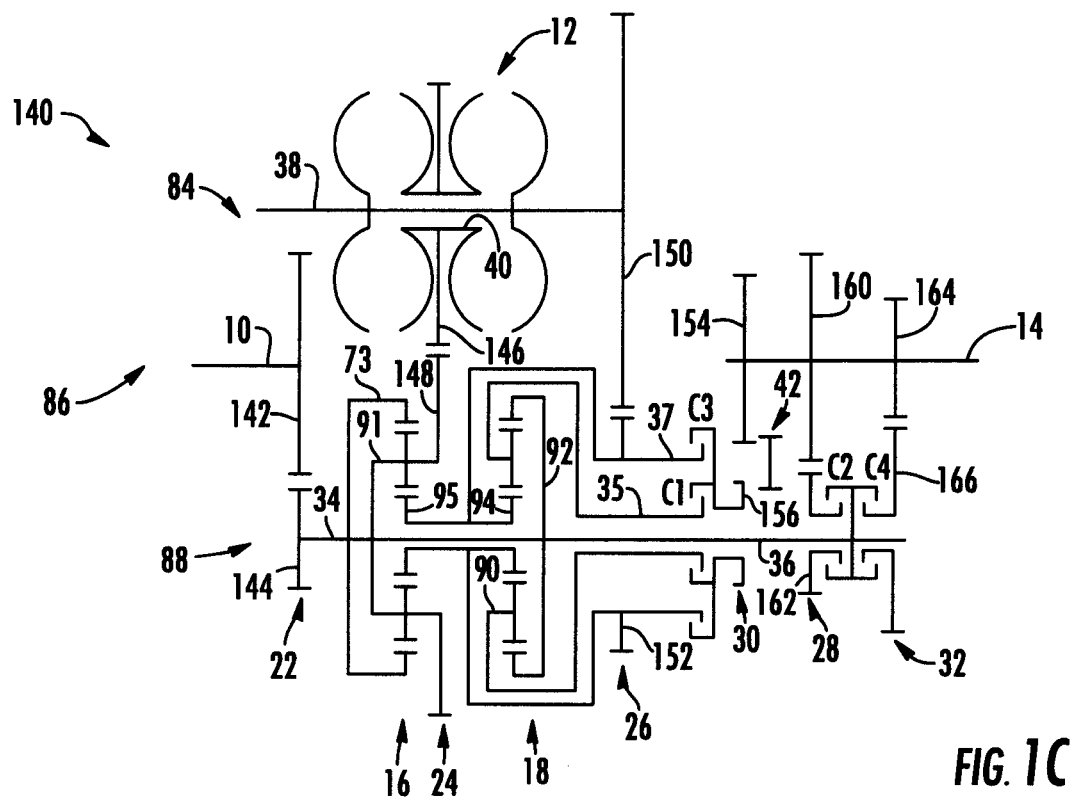
FIG. 1C is a schematic representation of another gearing arrangement for the gear scheme of FIG. 1A.

FIG. 1C shows another gearset and clutch arrangement 140 for the gear scheme 100. In the arrangement 140, the gearset 26 is coupled to the variator input shaft 38 and the gearset 24 is coupled to the variator output shaft 40.

Referring to the arrangement of FIG. 1C, the input gearset 22 includes intermeshing gears 142, 144, which are arranged in a similar fashion to the gears 112, 114 of FIG. 1B. The gearset 24 includes intermeshing gears 146, 148, where the gear 146 is concentric with and rotates with the variator output shaft 40, while the gear 148 is concentric with and rotates with the shaft 34, being connected thereto via the planets 97, 99 and the carrier 91 of the planetary gearset 16. The gearset 26 includes intermeshing gears 150, 152, where the gear 150 is concentric with and rotates with the shaft 38 and the gear 152 is concentric with and rotates with the shaft 37. The shaft 37 is coupled to the sun gears 94, 95. In the arrangement of FIG. 1C, the gearsets 28, 30, and 32, as well as the torque transmitting mechanisms C1, C2, C3, C4, are arranged in a similar fashion as shown in FIG. 1B. However, the gears 154, 160, 164 have different diameters than the corresponding gears 124, 126, 128 of FIG. 1B. The gears 154, 160, 164 are concentric with and rotate with the output shaft 14.

Figure 2A:
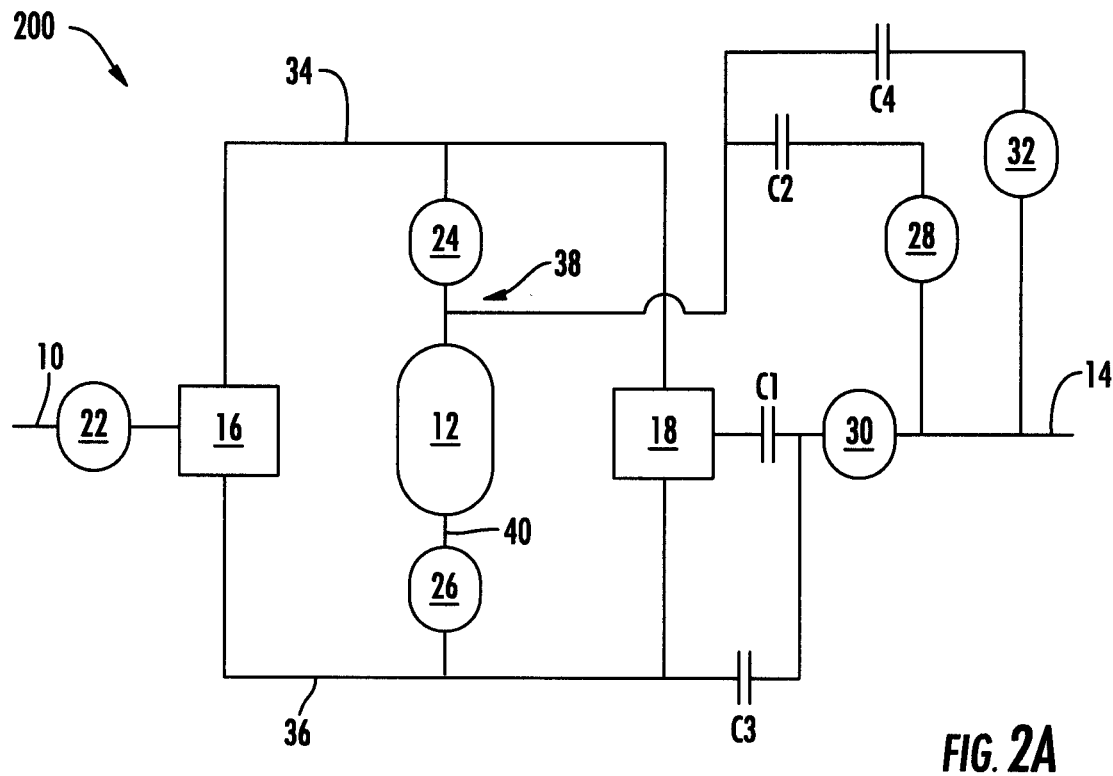
FIG. 2A is a diagrammatic representation of another gear scheme for an infinitely variable transmission.

FIG. 2A illustrates another gear scheme 200 for an infinitely variable transmission. The gear scheme 200 is similar to the gear scheme 100, except that the torque transmitting mechanisms C2, C4 and gearsets 28, 32 are connected to the variator input shaft 38 rather than to the output of the planetary gearsets 16, 18. In other words, the torque transmitting mechanisms C2, C4 and gearsets 28, 32 are located on the centerline 84 rather than the centerline 88.

Figure 2B:
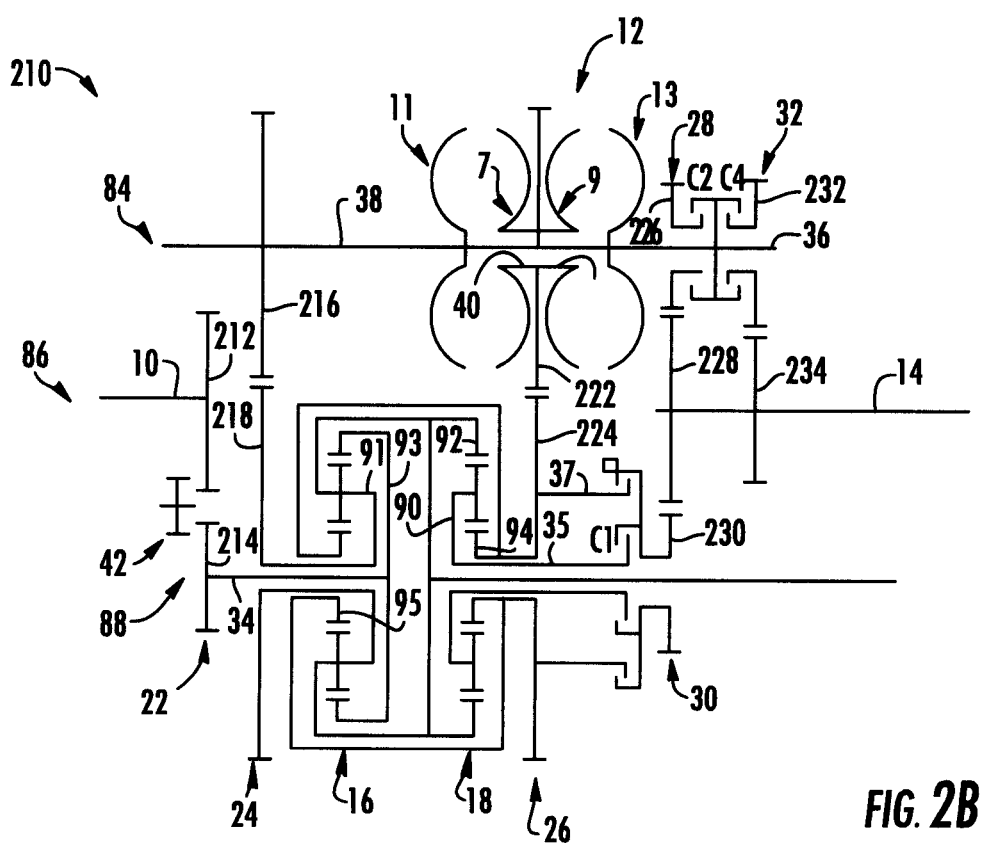
FIG. 2B is a schematic representation of a gearing arrangement for the gear scheme of FIG. 2A.

FIG. 2B illustrates one gearset and clutch arrangement 210 for the gear scheme 200. In the arrangement 210, the input gearset 22 includes gears 212, 214, and the idler 42 interposed therebetween. The gearset 24 includes intermeshing gears 216, 218, which are arranged in a similar fashion to the gears 116, 118 of FIG. 1B. The gearset 26 includes intermeshing gears 222, 224, which are arranged in a similar fashion to the gears 120, 122 of FIG. 1B. There are two, rather than three, output gears 228, 234, concentric with and rotating with the output shaft 14. The gearset 30 includes intermeshing gears 228, 230, which are arranged in a similar fashion to the gears 124, 130 of FIG. 1B, except that no idler is interposed therebetween. Also, the diameter of the gear 228 may be larger than the diameter of the gear 124.

In the arrangement 210, the gearset 28 includes intermeshing gears 226, 228, where the gear 226 is concentric with the shaft 36. In other words, the gear 228 is shared by the gearsets 28, 30. The gear 226 rotates about the shaft 36 when the torque transmitting mechanism C2 is not engaged, and rotates with the shaft 36 when the torque transmitting mechanism C2 is engaged. The gearset 32 includes intermeshing gears 232, 234. The gear 232 is concentric with the shaft 36. The gear 232 rotates about the shaft 36 when the torque transmitting mechanism C4 is not engaged, and rotates with the shaft 36 when the torque transmitting mechanism C4 is engaged. The gears 228, 234 are concentric with and rotate with the output shaft 14.

Figure 3C:
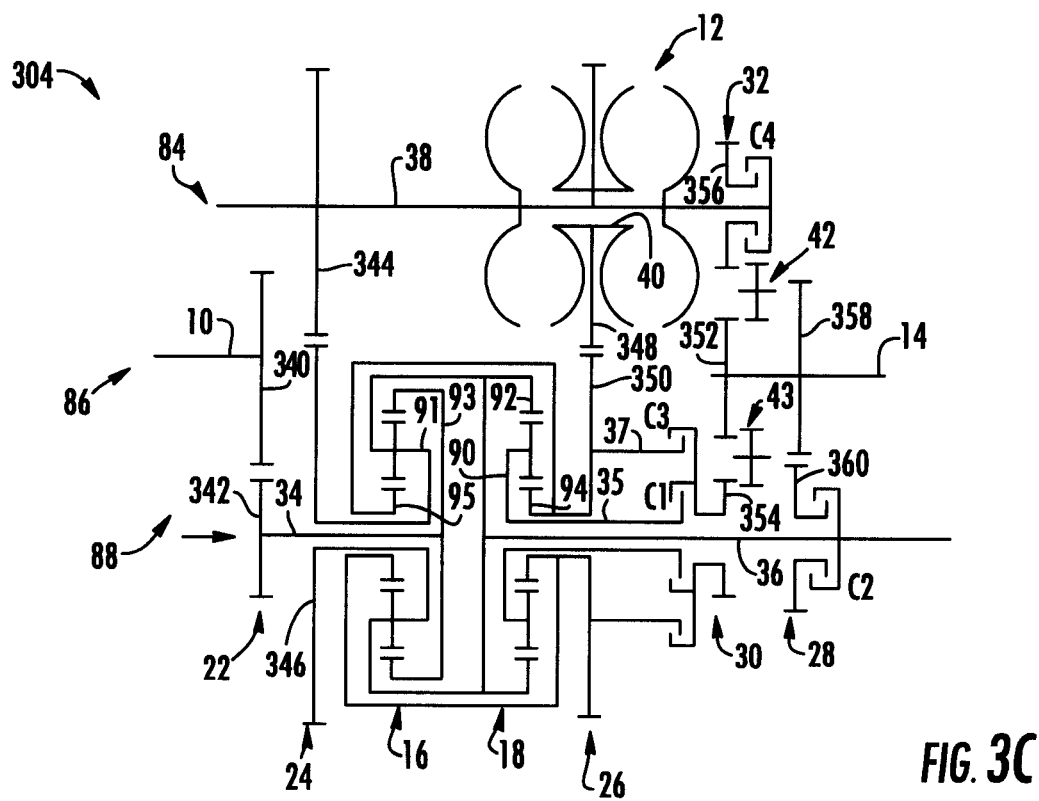
FIG. 3C is a schematic representation of another gearing arrangement for the gear scheme of FIG. 3A.
Figure 3A:
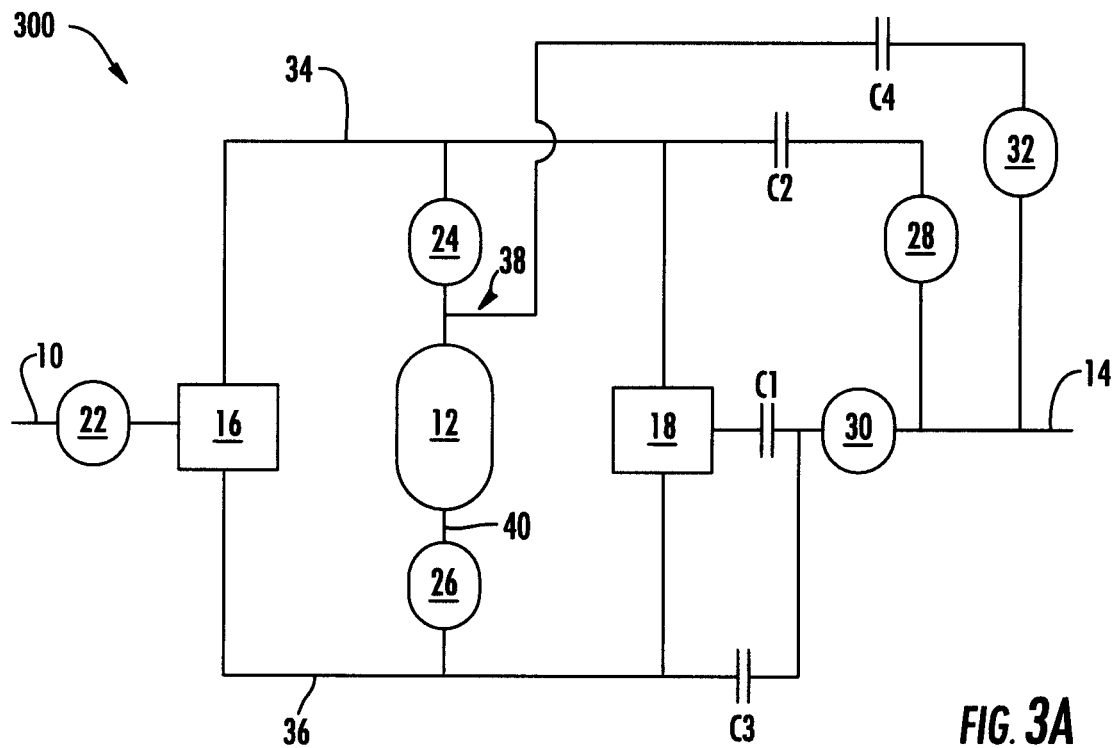
FIG. 3A is a diagrammatic representation of another gear scheme for an infinitely variable transmission.

FIG. 3A illustrates another gear scheme 300 for an infinitely variable transmission. The gear scheme 300 is similar to the gear scheme 200, except that only the torque transmitting mechanism C4 and gearset 32 are connected to the variator shaft 38. In other words, the torque transmitting mechanism C4 and gearset 32 are located on the centerline 84, while the other gearsets are located on the centerline 88. Whereas in the gear scheme 100, the mode 4 ratio spread (i.e. when C4 is engaged) is affected by both of the gearsets 24 and 32, in the gear scheme 300, the mode 4 ratio spread is affected by the gearset 32.

Figure 3B:
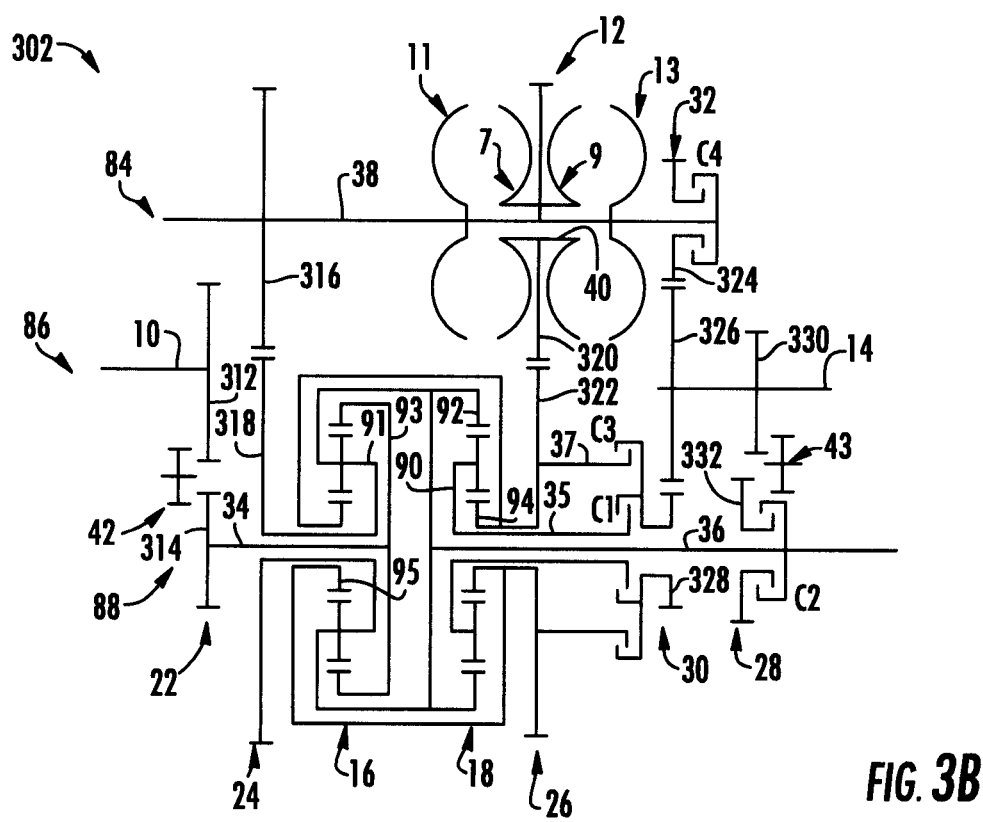
FIG. 3B is a schematic representation of a gearing arrangement for the gear scheme of FIG. 3A.

FIG. 3B illustrates one gearset and clutch arrangement 302 for the gear scheme 300. The arrangement 302 includes two idlers 42, 43. In the arrangement 302, the input gearset 22 includes gears 312, 314 and idler 42 arranged in a similar fashion to the gears 212, 214 of FIG. 2B, except that the gears 312, 314 may have different diameters than the gears 212, 214. The gearset 24 includes intermeshing gears 316, 318, which are arranged in a similar fashion to the gears 216, 218 of FIG. 2B, except that the gears 316, 318 may have different diameters than the gears 216, 218. The gearset 26 includes intermeshing gears 320, 322, which are arranged in a similar fashion to the gears 222, 224 of FIG. 2B, except that the gears 320, 322 may have different diameters than the gears 222, 224. The gearset 30 includes intermeshing gears 326, 328, which are arranged in a similar fashion to the gears 228, 230 of FIG. 2B, except that the gears 326, 328 may have different diameters than the gears 228, 230.

In the arrangement 302, the gearset 32 includes intermeshing gears 324, 326. In other words, the gearsets 30, 32 share the gear 326. The gear 324 is concentric with the shaft 38. The gear 324 rotates about the shaft 38 when the torque transmitting mechanism C4 is not engaged, and rotates with the shaft 38 when the torque transmitting mechanism C4 is engaged. The gearset 28 includes gears 330, 332 and an idler 43 interposed therebetween. The gear 332 is concentric with the shaft 36. The gear 332 rotates with the shaft 36 when the torque transmitting mechanism C2 is engaged, and rotates about the shaft 36 when the torque transmitting mechanism C2 is not engaged. The gears 326, 330 are concentric with and rotate with the output shaft 14.

FIG. 3C illustrates another gearset and clutch arrangement 304 for the gear scheme 300. The arrangement 304 is similar to the arrangement 302, except that the idlers 42, 43 are in different locations. The input gearset 22 includes intermeshing gears 340, 342 arranged in a similar fashion to the gears 112, 114 of FIG. 1B, except that the gears 340, 342 may have different diameters than the gears 112, 114. The gearset 24 includes intermeshing gears 344, 346 arranged in a similar fashion to the gears 316, 318 of FIG. 3B, except that the gears 344, 346 may have different diameters than the gears 316, 318. The gearset 26 includes intermeshing gears 348, 350 arranged in a similar fashion to the gears 320, 322 of FIG. 3B, except that the gears 348, 350 may have different diameters than the gears 320, 322. The gearset 30 includes gears 352, 354 and idler 43 interposed therebetween. The gear 354 is concentric with and rotates about the shaft 36. The gear 354 rotates with the shaft 35 when the torque transmitting mechanism 35 is engaged, and rotates with the shaft 37 when the torque transmitting mechanism C3 is engaged. The gears 352, 358 are concentric with and rotate with the output shaft 14.

Figure 3D:
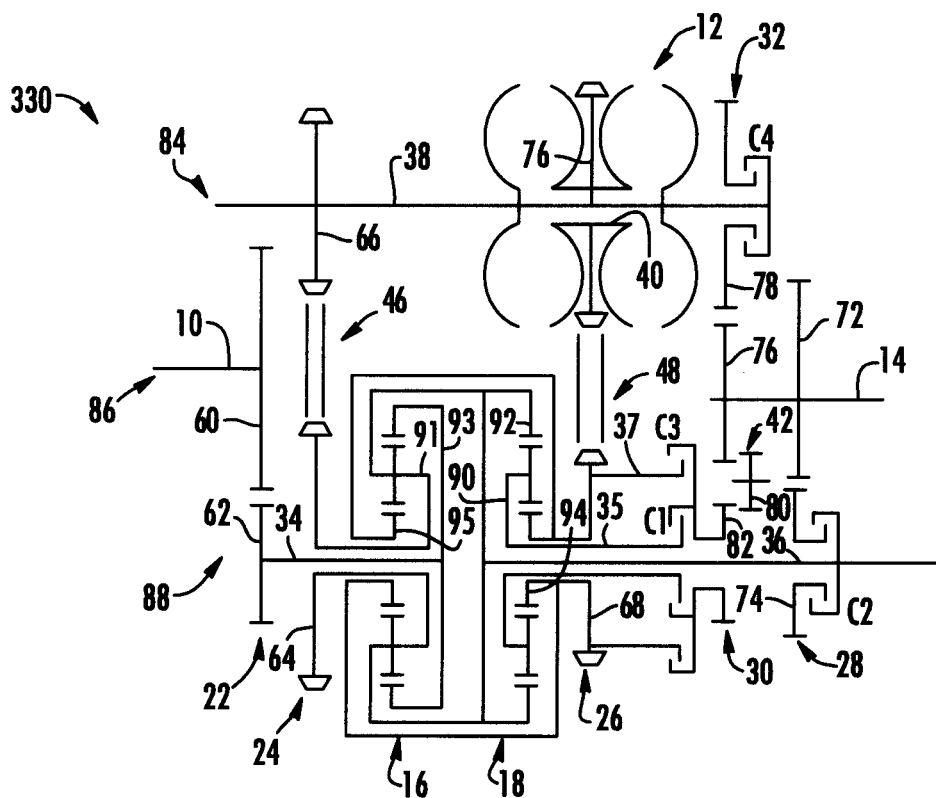
FIG. 3D is a schematic representation of still another gearing arrangement for the gear scheme of FIG. 3A.

FIG. 3D illustrates another gearset and clutch arrangement 306 for the gear scheme 300. The arrangement 306 is similar to the arrangement 302, except that chains are used instead of intermeshing gears in the gearsets 24, 26. The input gearset 22 includes intermeshing gears 60, 62, which are arranged in a similar fashion to the gears 340, 342 of FIG. 3C, except that the gears 60, 62 may have different diameters than the gears 340, 342. The gearset 24 includes a chain drive system including sprockets 64, 66 connected by a chain 46. The sprocket 66 is concentric with and rotates with the shaft 38. The sprocket 64 is concentric with and rotates about the shaft 34. The sprocket 64 is connected to the sun gear 95 of the planetary gearset 16 in a similar fashion to the gear 118 described above.

In the arrangement 306, the gearset 26 includes sprockets 68, 70 connected by a chain 48. The sprocket 70 is concentric with and rotates with the shaft 38. The sprocket 68 is concentric with and rotates about the shaft 36. The sprocket 68 is also connected to the shaft 37 and to the sun gear 94 in a similar fashion to the gear 122 described above.

Also in the arrangement 306, the gearset 30 includes gears 76, 82 and idler 42 interposed therebetween. The gear 82 is concentric with and rotates about the shaft 36. The gear 82 rotates with the shaft 35 when the torque transmitting mechanism C1 is engaged and rotate with the shaft 37 when the torque transmitting mechanism C3 is engaged. The gear 76 is concentric with and rotates with the output shaft 14. The gearset 28 includes intermeshing gears 72, 74. The gear 72 is concentric with and rotates with the output shaft 14. The gear 74 is concentric with the shaft 36. The gear 74 rotates with the shaft 36 when the torque transmitting mechanism C2 is engaged and rotates about the shaft 36 when the torque transmitting mechanism C2 is not engaged. The gearset 32 includes intermeshing gears 76, 78. The gear 78 is concentric with the shaft 38. The gear 78 rotates with the shaft 38 when the torque transmitting mechanism C4 is engaged and rotates about the shaft 38 when the torque transmitting mechanism C4 is not engaged. The gear 76 is shared by the gearsets 30, 32.

Figure 4A:
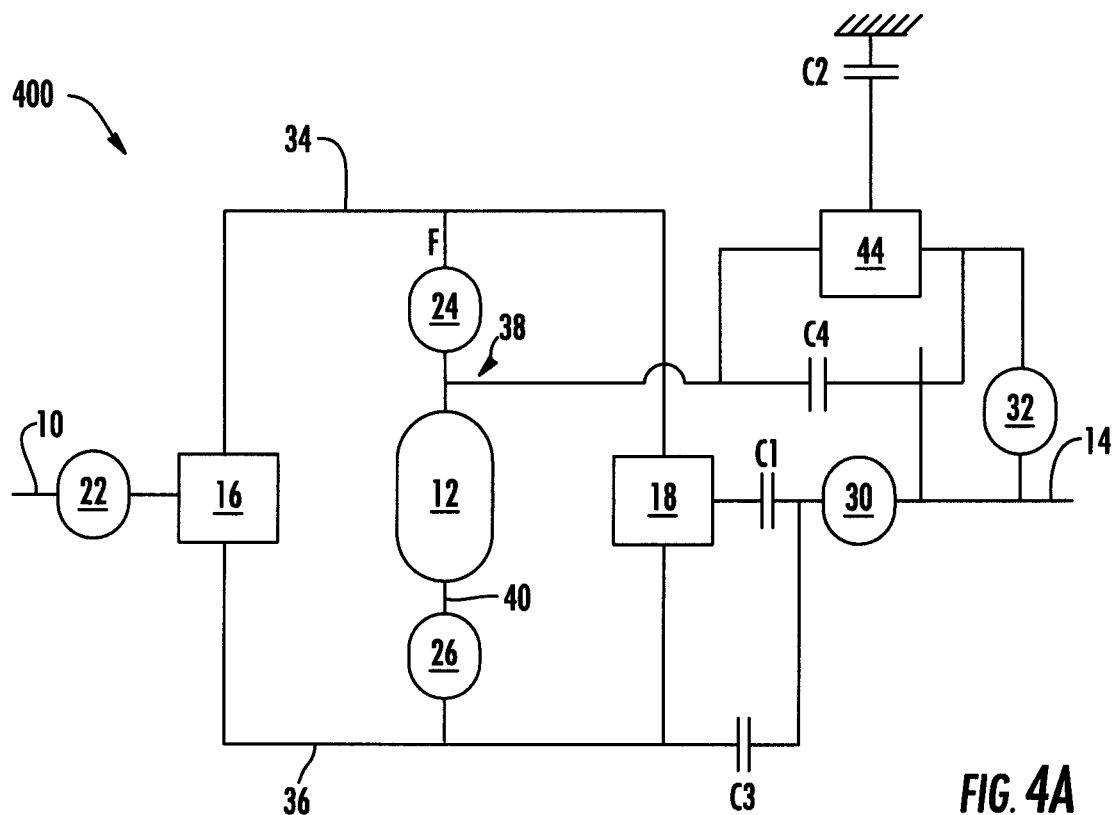
FIG. 4A is a diagrammatic representation of another gear scheme for an infinitely variable transmission.

FIG. 4A illustrates a gear scheme 400 for an infinitely variable transmission. The gear scheme 400 includes another planetary gearset 44, which is positioned on the centerline 84 with the variator 12. Also, in the gear scheme 400, the torque transmitting mechanism C2 is a stationary clutch.

Figure 4B:
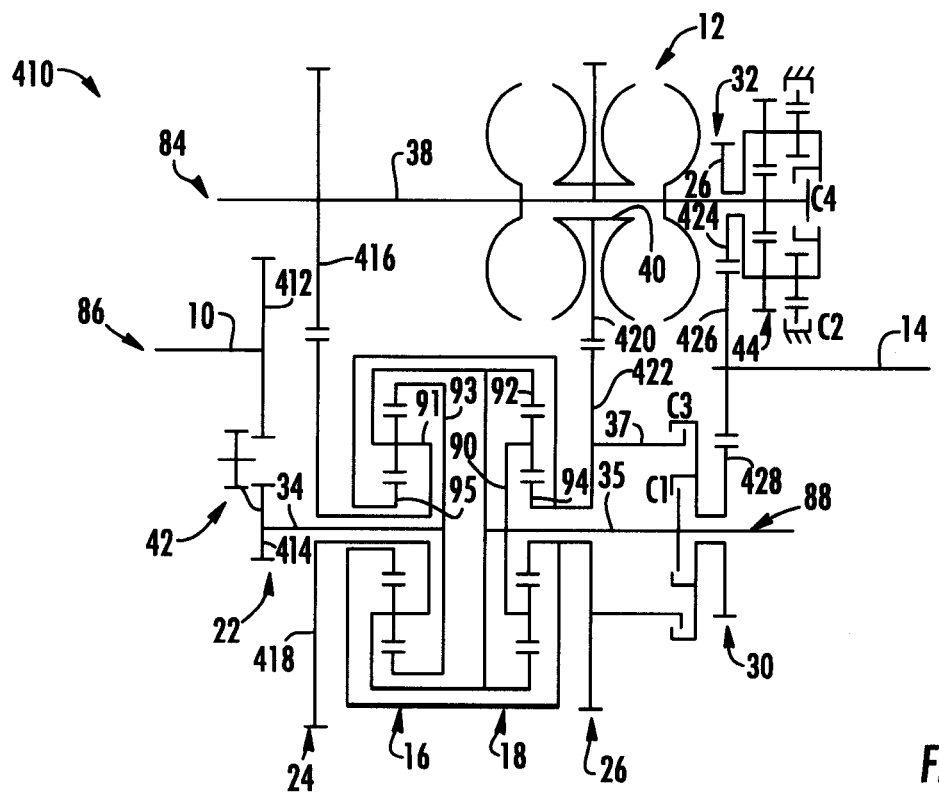
FIG. 4B is a schematic representation of a gearing arrangement for the transmission of FIG. 4A.

FIG. 4B illustrates a gear and clutch arrangement 410 for the gear scheme 400. The arrangement 410 includes only one gear 426 that is connected to and rotating with the output shaft 14. The gear 426 intermeshes with a gear 424 of the gearset 32 and intermeshes with a gear 428 of the gearset 30. The torque transmitting mechanism C2 is a stationary clutch and holds a ring gear 430 of the planetary gearset 44 when engaged. The torque transmitting mechanism C4 is a rotating clutch and holds the sun gear 432 of the planetary gearset 44 when engaged. The gearset 26 includes gears 420, 422, which are configured in a similar fashion as the gears 120, 122 described above and shown in FIG. 1B, except that the gears 420, 422 may have different diameters than the gears 120, 122. The gearset 24 includes gears 416, 418, which are configured in a similar fashion as the gears 116, 118 described above, except that the gears 416, 418 may have different diameters than the gears 116, 118. The gearset 22 includes gears 412, 414, and the idler 42, which are configured in a similar fashion to the gears 212, 214 and idler 42, shown in FIG. 2B and described above, except that the gears 412, 414 may have different diameters than the gears 212, 214.

FIG. 5 illustrates the spatial relationship between the components of the gear and clutch arrangement 306, as well as the size and positioning of the arrangement 306 relative to other parts of a vehicle in which it may be installed. When installed, the arrangement 306 fits within a region defined by the vehicle floorboard 50 and the vehicle frame rails 52, 54. A circle 56 represents the diameter of the drive unit's (e.g. engine's) mounting flange. As can be seen in FIG. 5, all of the components of the arrangement 306 fit within the diameter 56. A block 58 represents the space occupied by the variator and transmission controls, which typically include hydraulic, electronic, pneumatic components and/or a combination thereof, which control the operation of the variator 12 and control the engagement and release of the torque transmitting mechanisms C1, C2, C3, C4. The other gearset and clutch arrangements described and shown herein have a similar spatial configuration as shown in FIG. 5.

The relative sizes of the gearing and other transmission components shown in the drawings and described above are generally representative of the disclosed embodiments. One example of gearing ratios and resulting transmission ratio coverage for a gear scheme having two planetary gearsets and three output gearsets (such as gear schemes 100, 200 and 300) is shown in Tables 1 and 2 below.

TABLE 1

Example Ratios

| Gearset | Ratio |
| --- | --- |
| 22 | −1.9 |
| 24 | 2.5 |
| 26 | 0.900852 |
| 28 | −0.32529 |
| 30 | 0.368242 |
| 32 | −0.84575 |
| 16 ($N_{sun}/N_{ring}$) | 0.5696 |
| 18 ($N_{sun}/N_{ring}$) | 0.387644 |

TABLE 2

Example Transmission Ratio Coverage

| Mode | Low | High |
| --- | --- | --- |
| 1 | −0.15996 | 0.127692 |
| 2 | 0.127692 | 0.298177 |
| 3 | 0.298177 | 0.83 |
| 4 | 0.83 | 1.93815 |

It will be understood, however, that the ratios and resulting ratio coverage of the transmission may vary according to the size, packaging, ratio coverage, and/or other requirements of a particular design. In general, the size, spacing and arrangement of the components of the gear schemes described herein are adaptable to varying design and/or packaging requirements, and the illustrated arrangements are just some examples of many possible configurations of these elements.

The specific arrangement of the planetary gearsets 16, 18 and connections thereto shown in the drawings and described herein is one possible arrangement of such components and is not necessarily required. Other variations on the arrangement of the planetary gearsets 16, 18 are contemplated by this disclosure. For example, one or more components of the planetary gearsets 16, 18 could be connected to the variator output shaft 40.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. An infinitely variable transmission having a geared neutral mode and at least three forward operating modes, comprising
    an input shaft,
    an idler gear coupled to the input shaft,
    an output shaft spaced from and coaxial with the input shaft,
    a variator having continuously variable torque output, the variator being coupled between the input shaft and the output shaft,
    at least one clutch, wherein the variator and the at least one clutch define a first centerline, and
    a pair of planetary gearsets coupled between the input and output shafts, coupled to each other and coupled to the variator, the planetary gearsets being positioned beside the variator in the transmission.

2. The transmission of claim 1, comprising less than three planetary gearsets.

3. The transmission of claim 1, wherein at least a portion of the planetary gearsets is coplanar with the variator.

4. The transmission of claim 1, comprising less than four output gearsets coupled between the planetary gearsets and the output shaft.

5. The transmission of claim 1, comprising a third planetary gearset coupled between the variator and the output shaft and less than three output gearsets coupled between the planetary gearsets and the output shaft.

6. The transmission of claim 1, wherein the diameter of a circle encompassing the transmission is less than the diameter of a mounting flange of a drive unit to which the transmission is mountable.

7. An infinitely variable transmission, comprising
an input shaft,
an output shaft spaced from the input shaft and coaxial therewith,
a variator coupled between the input shaft and the output shaft,
a pair of planetary gearsets laterally spaced from the variator and coupled between the input shaft and the output shaft, each of the planetary gearsets having at least one component coupled to each other and at least one component coupled to the variator,
an input gearset including an idler gear coupled to the input shaft,
a plurality of output gearsets coupled to the planetary gearsets and the variator, the plurality of output gearsets coupled to the output shaft, and
first, second, third and fourth torque transmitting mechanisms positioned between the input shaft and the output shaft, the first torque transmitting mechanism being engageable to place the transmission in a geared neutral mode, the second torque transmitting mechanism being engageable to place the transmission in a first forward operating mode, the third torque transmitting mechanism being engageable to place the transmission in a second forward operating mode, and the fourth torque transmitting mechanism being engageable to place the transmission in a third forward operating mode,
wherein the variator and at least one of the first, second, third, and fourth torque transmitting mechanisms define a first centerline.

8. The transmission of claim 7, wherein the transmission has a double shunt architecture, such that the variator is isolated from transmission input and transmission output when the first torque transmitting mechanism is engaged, and the transmission is output coupled when any of the second, third, and fourth torque transmitting mechanisms is engaged and the remaining torque transmitting mechanisms are not engaged.

9. The transmission of claim 7, wherein the first, second, third, and fourth torque transmitting mechanisms are rotating clutches.

10. The transmission of claim 7, wherein the first, third and fourth torque transmitting mechanisms are rotating clutches and the second torque transmitting mechanism is a stationary clutch.

11. An infinitely variable transmission, comprising
a first centerline comprising a variator, no more than two output gearsets, and no more than two selectively engageable torque transmitting mechanisms,
a second centerline parallel to and spaced from the first centerline and comprising at least one of an input shaft and an output shaft,
a third centerline spaced from and parallel to both the first and the second centerlines and comprising a pair of planetary gearsets, each planetary gearset having at least one component connected to a component of the other planetary gearset, no more than three output gearsets and no more than four selectively engageable torque transmitting mechanisms, and
a first gearset coupled to the input shaft and to a first component of the planetary gearsets, wherein the first gearset comprises a first idler gear.

12. The transmission of claim 11, comprising a second gearset coupled to a first side of the variator and to a second component of the planetary gearsets and a third gearset coupled to a second side of the variator and to a third component of the planetary gearsets.

13. The transmission of claim 12, comprising a fourth gearset coupled to the output shaft and selectively coupled to output of the third gearset.

14. The transmission of claim 13, comprising a fifth gearset coupled to the output shaft and selectively coupled to the output of the third gearset.

15. The transmission of claim 14, wherein the fifth gearset comprises a second idler gear.

16. The transmission of claim 11, wherein the third centerline comprises three concentric shafts.

17. The transmission of claim 11, comprising a first shaft located on the third centerline, wherein at least the first gearset and the planetary gearsets are connected to the first shaft.

18. The transmission of claim 17, comprising a second shaft concentric with the first shaft, wherein a first component of the planetary gearsets is coupled to the second shaft and at least the fourth gearset is selectively coupled to the second shaft.

19. The transmission of claim 18, comprising a third shaft concentric with the first and second shafts, wherein a second component of the planetary gearsets is coupled to the third shaft and at least the fourth gearset is selectively coupled to the third shaft.

* * * * *